US011435854B2

United States Patent
Lin et al.

(10) Patent No.: US 11,435,854 B2
(45) Date of Patent: Sep. 6, 2022

(54) TOUCH DISPLAY DEVICE (71) Applicant: WUHAN CHINA STAR OPTOELECTRONICS SEMICONDUCTOR DISPLAY TECHNOLOGY CO., LTD., Hubei (CN)

(72) Inventors: Dan Lin, Hubei (CN); Qibing Dai, Hubei (CN); Minlun Liu, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 210 days.

(21) Appl. No.: 16/954,701

(22) PCT Filed: Nov. 19, 2019

(86) PCT No.: PCT/CN2019/119315
§ 371 (c)(1),
(2) Date: Jun. 17, 2020

(87) PCT Pub. No.: WO2021/068357
PCT Pub. Date: Apr. 15, 2021

(65) Prior Publication Data
US 2022/0129107 A1  Apr. 28, 2022

(30) Foreign Application Priority Data

Oct. 12, 2019  (CN) .......................... 201910968066.2

(51) Int. Cl.
*G06F 3/041* (2006.01)
*G06F 3/044* (2006.01)

(52) U.S. Cl.
CPC .......... *G06F 3/0418* (2013.01); *G06F 3/0412* (2013.01); *G06F 3/0443* (2019.05);
(Continued)

(58) Field of Classification Search
CPC ............. G06F 3/04144; G06F 3/04146; G06F 3/0414; G06F 3/0412; G06F 3/045;
(Continued)

(56) References Cited

U.S. PATENT DOCUMENTS 10,175,804 B2   1/2019  Yoon
2017/0090637 A1  3/2017  Yoon et al.
(Continued)

FOREIGN PATENT DOCUMENTS

CN   107885390 A   4/2018
CN   109656428 A   4/2019
(Continued)

*Primary Examiner* — Hong Zhou (57) ABSTRACT

A touch display device is provided and includes a substrate, light emitting layer, encapsulation layer, a touch layer, and a touch driver inspection circuit. The touch layer includes a plurality of touch electrode units. The touch driver inspection circuit is connected to each of the touch electrode units the touch layer and is configured to monitor a touch position according to variation of a capacitance of the touch electrode units. The touch driver inspection circuit is further configured to monitor a pressure of the touch position according to variation of pressures on the touch electrode units.

13 Claims, 8 Drawing Sheets

(52) U.S. Cl.
CPC .............. *G06F 3/04164* (2019.05); *G06F 2203/04105* (2013.01); *G06F 2203/04111* (2013.01)

(58) Field of Classification Search
CPC .. G06F 3/0418; G06F 3/04164; G06F 3/0443; G06F 2203/04105; G06F 2203/04111; G06F 2203/04106
See application file for complete search history.

(56) References Cited

U.S. PATENT DOCUMENTS

| | | | | |
|---|---|---|---|---|
| 2017/0242518 A1* | 8/2017 | Liu | ............... | G06F 3/0412 |
| 2017/0329448 A1* | 11/2017 | Li | ............... | G06F 3/0412 |
| 2017/0371471 A1* | 12/2017 | Kim | ............... | G02F 1/1343 |
| 2018/0074638 A1* | 3/2018 | Chiang | ............ | G06F 3/045 |
| 2020/0150826 A1* | 5/2020 | Hwang | ............ | G06F 3/04144 |
| 2021/0019020 A1* | 1/2021 | Hyung | ............ | G06F 3/047 |

FOREIGN PATENT DOCUMENTS

| | | |
|---|---|---|
| CN | 109669571 A | 4/2019 |
| CN | 109917965 A | 6/2019 |

\* cited by examiner

TOUCH DISPLAY DEVICE

FIELD OF INVENTION

The present invention relates to a field of displays, especially relates to a touch display device.

BACKGROUND OF INVENTION

For a touch display device, touch operation is an important human-computer interaction operation. Therefore, precisely inspecting parameters of touch operation is one important means for guaranteeing user experience of the touch display device.

A touch display device comprises a touch display panel. At present, most of touch display panels can only implement two dimensional (2D) coordinate inspection and cannot perform three dimensional (3D) coordinate inspection. The 2D coordinate inspection can inspect a coordinate of a touch position of a finger on a surface of the touch display panel along a X-axis direction and a Y-axis direction. The 3D coordinate inspection can inspect a coordinate of a touch position of a finger on a surface of the touch display panel along a X-axis direction, a Y-axis direction and a Z-axis direction. The Z-axis direction refers to a direction perpendicular to the surface of the touch display panel, and the Z-axis direction is configured to inspect pressure of a finger pressing against the screen.

In the prior art, to achieve three dimensional (3D) coordinate inspection, a user employs opposite independent capacitor touch unit and a pressure touch unit, which makes the structural design of the display device complicated and increases the cost of the touch display device.

SUMMARY OF INVENTION

Technical Issue

An objective of the present invention is to provide a display device to solve a technical issue that a conventional 3D touch display device is structurally complicated and the display device has a high manufacturing cost.

Technical Solution

To achieve the objective, the present invention provides a touch display device, comprising a substrate; a light emitting layer disposed on a side of the substrate; an encapsulation layer disposed on a side of the light emitting layer away from the substrate; a touch layer disposed on a side of the encapsulation layer away from the light emitting layer, and comprising a plurality of touch electrode units; and a touch driver inspection circuit connected to each of the touch electrode units of the touch layer, and configured to according to variation of a capacitance of the touch electrode units and monitor a touch position; wherein the touch driver inspection circuit is further configured to monitor a pressure of the touch position according to variation of pressures on the touch electrode units.

Furthermore, each of the touch electrode units comprises: a first touch electrode wire and a second touch electrode wire, the first touch electrode wire and the second touch electrode wire are wrapped around a node along a predetermined direction, an end of the first touch electrode wire is electrically connected an end of the second touch electrode wire at the node, and another end of the first touch electrode wire and another end of the second touch electrode wire are electrically connected to the touch driver inspection circuit.

Furthermore, the first touch electrode wire and the second touch electrode wire are multi-metal layer structures each of which comprises a pressure-sensitive material layer.

Furthermore, the first touch electrode wire and the second touch electrode wire are wrapped around the node along the predetermined direction to form rectangular coils or circular coils.

Furthermore, both the first touch electrode wire and the second touch electrode wire are wrapped around the node clockwise or counterclockwise.

Furthermore, each of the touch electrode units further comprises a connection block disposed on the node, the connection block is electrically connected to an end of the first touch electrode wire and an end of the second touch electrode wire.

Furthermore, each of the touch electrode units further comprises a first lead wire and a second lead wire; another end of the first touch electrode wire is electrically connected to the touch driver inspection circuit through the first lead wire; and another end of the second touch electrode wire is electrically connected to the touch driver inspection circuit through the second lead wire.

Furthermore, a first insulation layer is disposed between the first lead wire and the touch electrode units, and the first lead wire is electrically connected to another end of the first touch electrode wire through a first through hole defined in the first insulation layer; and a second insulation layer is disposed between the second lead wire and the touch electrode units, and the second lead wire is electrically connected to another end of the second touch electrode wire through a second through hole defined in the second insulation layer.

Furthermore, the touch driver inspection circuit comprises a capacitance inspection sub-circuit configured to inspect a capacitance of the touch electrode units and a pressure inspection sub-circuit configured to inspect pressures on the touch electrode units.

Furthermore, the pressure inspection sub-circuit comprises a compensation resistor (R2), a first bridge arm resistor (R3), a second bridge arm resistor (R4), and a power source; an end of the touch electrode units is electrically connected to an end of the compensation resistor (R2), another end of the compensation resistor (R2) is electrically connected to an end of the second bridge arm resistor (R4), another end of the second bridge arm resistor (R4) is connected to an end of the first bridge arm resistor (R3), and another end of the first bridge arm resistor (R3) is electrically connected to another end of the touch electrode units; and an end of the power source is electrically connected to another end of the first bridge arm resistor (R3) and another end of the touch electrode units, and another end of the power source is electrically connected to another end of the compensation resistor (R2) and an end of the second bridge arm resistor (R4).

Advantages

Advantages of the present invention is to provide a touch display device that uses a touch layer to replace a capacitor touch unit and a pressure touch unit in the prior art to achieve two dimensional and three dimensional inspections for the touch display device. The touch layer is structurally simple, satisfies requirement of light weight and compactness for the touch display device without increasing difficulty of wiring of the touch layer, and lowers the manufacturing cost thereof.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

Reference characters are as follows:

1 substrate; 2 light emitting layer; 3 encapsulation layer; 4 touch layer;

5 touch driver inspection circuit; 6 optical clear adhesive layer; 7 cover plate;

8 first insulation layer; 9 first via hole 10 second insulation layer; 11 second via hole;

100 node; 101 connection block; 200 blind region;

41 touch electrode units; 51 capacitance inspection sub-circuit; 52 pressure inspection sub-circuit;

411 first touch electrode wire; 412 second touch electrode wire; 413 first lead wire; 414 second lead wire.

DETAILED DESCRIPTION OF PREFERRED EMBODIMENTS

The preferred embodiments of the present invention are described below with reference to the accompanying drawings, which are used to exemplify the embodiments of the present invention to a person of ordinary skill in the art to make the technical contents of the present invention clearer and easy to understand. However, the present invention may be embodied in many different forms of embodiments, and the scope of the invention is not limited to the embodiments mentioned herein.

First Embodiment

The embodiment of the present invention provides a touch display device, the touch display device in an aspect can achieve display functions and in another aspect can allow users to implement touch operation, which further achieve corresponding control.

Figure 1:
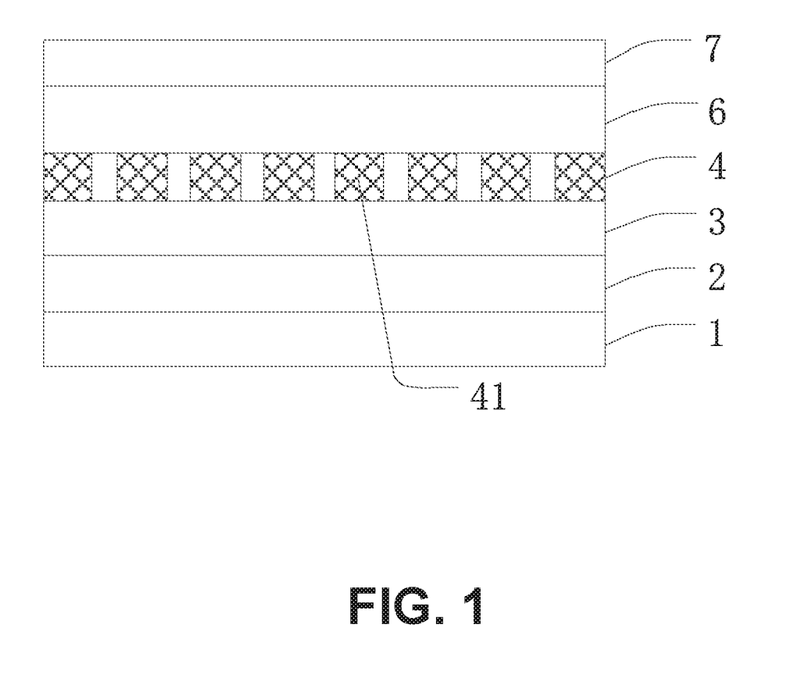
FIG. 1 is a schematic structural view of a touch display device of a first embodiment of the present invention.
Figure 2:
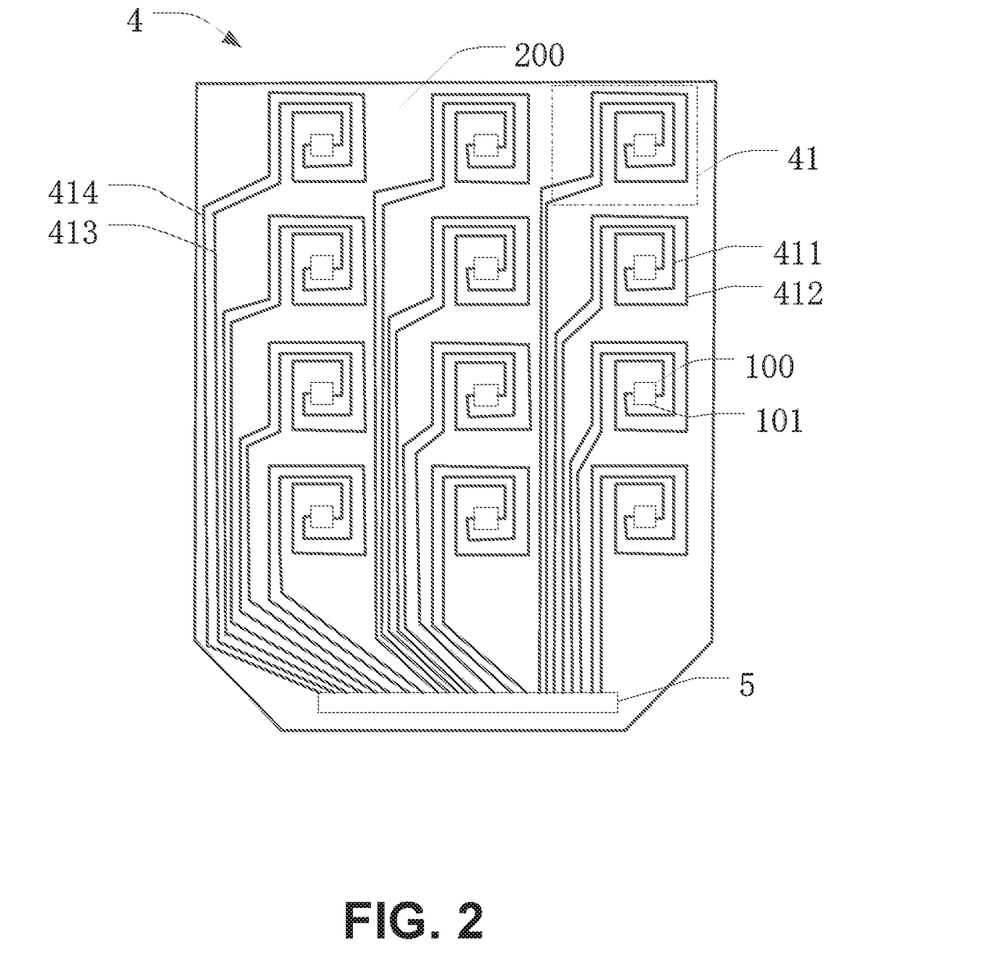
FIG. 2 is a schematic plane view of the first embodiment of the present invention the touch layer.

With reference to FIGS. 1 to 2, the touch display device comprises a substrate 1, a light emitting layer 2, an encapsulation layer 3, a touch layer 4, a touch driver inspection circuit 5, an optical clear adhesive layer 6, and a cover plate 7.

The substrate 1 is an array substrate and comprises a plurality of thin film transistor configured to drive the touch display device to operate.

The light emitting layer 2 is disposed on the substrate, and the light emitting layer 2 is preferably an organic light emitting diode (OLED) light emitting layer. Driven by an electrical field, an organic semiconductor material and a light emitting material emit light by carrier injection and compounding.

The encapsulation layer 3 is disposed on a surface of a light emitting layer 2 and is configured to protect the light emitting layer 2 to prevent external water and oxygen from invading an internal of the touch display device and damaging the driver circuit.

The touch layer 4 is disposed on an upper surface of the encapsulation layer 3, and the touch layer 4 comprises a plurality of touch electrode units 41. Adjacent two of the touch electrode units 41 are insulated from each other. Preferably, in a plane, a plurality of touch electrode units 41 are arranged in an array. The touch layer 4 not only achieves two dimensional (2D) coordinate inspection of the touch display device, but also achieves three dimensional (3D) coordinate inspection of the touch display device. The touch driver inspection circuit 5 is connected to each of the touch electrode units 41 of the touch layer 4, and is configured monitor a touch position according to variation of a capacitance of the touch electrode units 41. The touch driver inspection circuit 5 is also configured to monitor a pressure of the the touch position according to variation of pressures on the touch electrode units 41.

Both the first touch electrode wire 411 and the second touch electrode wire 412 are multi-metal layer structures each of which comprises a pressure-sensitive material layer. the pressure-sensitive material layer has very strong sensitivity to pressure such that the first touch electrode wire 411 and the second touch electrode wire 412 has excellent touch sensitivity to improve pressure touch effect achieved by the touch display device. The metal structure is a structure of titanium aluminum titanium or a structure of molybdenum aluminum molybdenum. The pressure-sensitive material layer can be disposed on a side surface of the metal structure, and can be disposed on an upper surface and a lower surface of the metal structure. The multi-metal layer structures can enhance rupture-resistant capability of the first touch electrode wire 411 and the second touch electrode wire 412 under a pressure to lower light reflection and to further improve the quality of the touch display device.

With reference to FIG. 2, a complete display panel can be divided into a plurality of rectangular regions, a touch electrode units 41 is disposed in each of the rectangular regions, a position of each of the touch electrode units 41 is a coordinate in the display panel. A plurality of touch electrode units 41 arranged in the array covers the entire display panel to guarantee excellent touch effect of each touch points of the display panel.

Each of the touch electrode units 41 comprises a first touch electrode wire 411, a second touch electrode wire 412, a first lead wire 413, and a second lead wire 414. Both the first touch electrode wire 411 and the second touch electrode wire 412 are wrapped around a node 100 along a predetermined direction and are disposed at an interval to achieve insulation effect from each other. The predetermined direction can be a clockwise direction or a counterclockwise direction. An end of the first touch electrode wire 411 is electrically connected to an end of the second touch electrode wire 412 at the node 100. Both another end of the first touch electrode wire 411 and another end of the second touch electrode wire 412 are electrically connected to the touch driver inspection circuit 5. Specifically, the another end of the first touch electrode wire 411 is electrically connected to the touch driver inspection circuit 5 through the first lead wire 413, and the another end of the second touch electrode wire 412 is electrically connected to touch driver inspection circuit 5 through the second lead wire 414.

In the embodiment of the present invention, the first lead wire 413 and the second lead wire 414 comprise multi-metal layer structures, and the metal structures are titanium aluminum titanium structures or molybdenum aluminum molybdenum structures having excellent electrical conductivity. The multi-metal layer structures can improve rupture-resistant capability of the first lead wire 413 and the second lead wire 414 under a pressure and can lower light reflection to enhance the quality of the touch display device.

In one of the touch electrode units 41, the first touch electrode wire 411 and the second touch electrode wire 412 are wrapped around the connection block 101 counterclockwise to form rectangular coils, and fully cover a rectangular region of the display panel. When a user operates the display panel with fingers, the touch sensitivity of the touch display device can be improved. Furthermore, during pressure touch, a contacting area of the connection block 101 with the fingers is increased to improve the touch sensitivity. A pattern of the connection block 101 is preferably rectangular but can be other pattern as long as touch sensitivity of the touch display device is enhanced. In the embodiment of the present invention, the first touch electrode wire 411 and the second touch electrode wire 412 can be also wrapped around the node 100 along the predetermined direction to form circular coils as a diagonal coil arrangement.

Preferably, in the embodiment of the present invention, each of the touch electrode units 41 has the same surface area, which facilitates monitoring a touch position of the display panel and the pressure of the touch position to improve touch precision of 2D or 3D. Furthermore, a stress generated from the touch electrode units 41 under a pressure is easily released when the surface area of each of the touch electrode units 41 is the same such that, a risk of rupture of the first touch electrode wire 411 and the second touch electrode wire 412 is lowered. Therefore, each of the touch electrode units 41 has excellent electrical conductivity to further improve the quality of the touch display device.

In the touch display device, the touch layer 4 further comprises a blind region 200 surrounding the touch electrode units 41. Because the positions occupied by the first lead wire 413 and the second lead wire 414 cannot be disposed with touch electrode units 41, a blind region 200 is formed. In a plane, the first touch electrode wire 411, the second touch electrode wire 412, the first lead wire 413, and the second lead wire 414 are disposed in the same layer, and are insulated from one another, which can fulfill the requirement of light weight and compactness to the touch display device without increase of difficulty of wiring of the touch layer and lower the manufacturing cost thereof.

Figure 3:
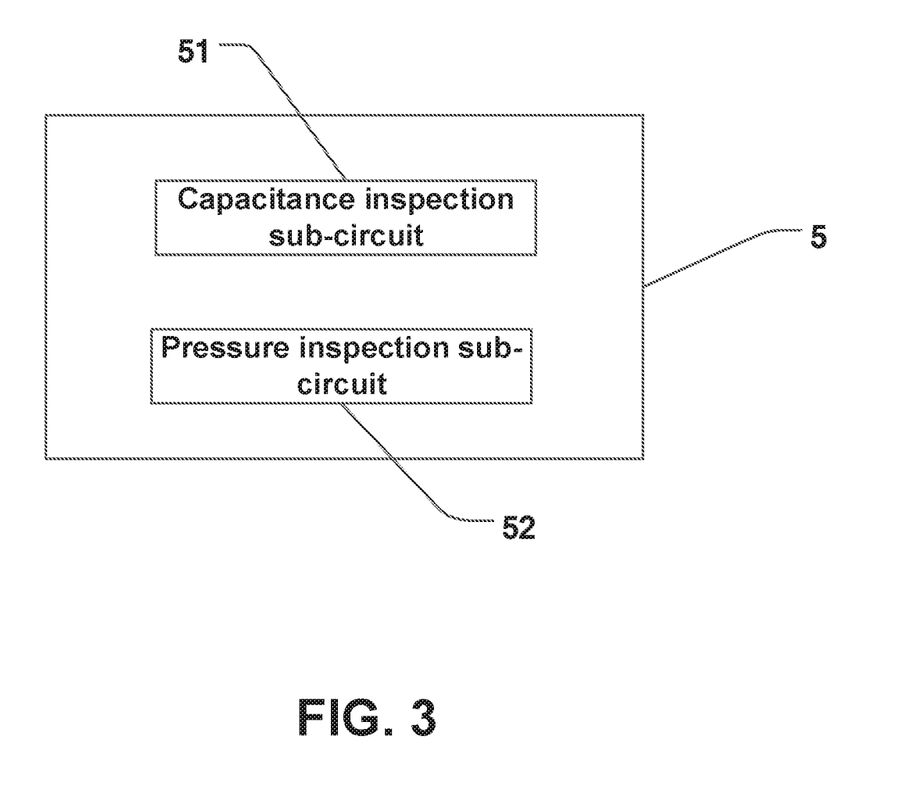
FIG. 3 is a function diagram of a touch driver inspection circuit of the first embodiment of the present invention.

With reference to FIG. 3, the touch driver inspection circuit 5 comprises a capacitance inspection sub-circuit 51 configured to inspect the touch electrode units 41 and a pressure inspection sub-circuit 52 configured to inspect pressures on the touch electrode units 41.

During work, touch display device operates in sequences. First, directions of a X-axis and a Y-axis of the display panel are detected, and then a direction of a Z-axis of the display panel is detected. When a certain position of the display panel is touched by a finger, a certain one of the touch electrode units 41 in the display panel inspects a touch signal, the first touch electrode wire 411 and the second touch electrode wire 412 in the touch electrode unit 41 forms a self-capacitor with a finger, the capacitance inspection sub-circuit 51 inspect variation of a capacitance of the capacitor of the touch electrode units 41 to determine a touch position, i.e., directions of the X-axis and the Y-axis. Furthermore, the pressure inspection sub-circuit 52 inspects pressures on the touch electrode units 41 to determine a pressure position i.e., a direction of the Z-axis. In short, when a finger inputs a signal into the display panel, the touch driver inspection circuit 5 acquires a signal of variation of a capacitance of the capacitor of the touch electrode units 41, and then acquires a signal of pressures on the touch electrode units 41 to achieve inspection and 3D inspection of the touch display device 2D.

Figure 4:
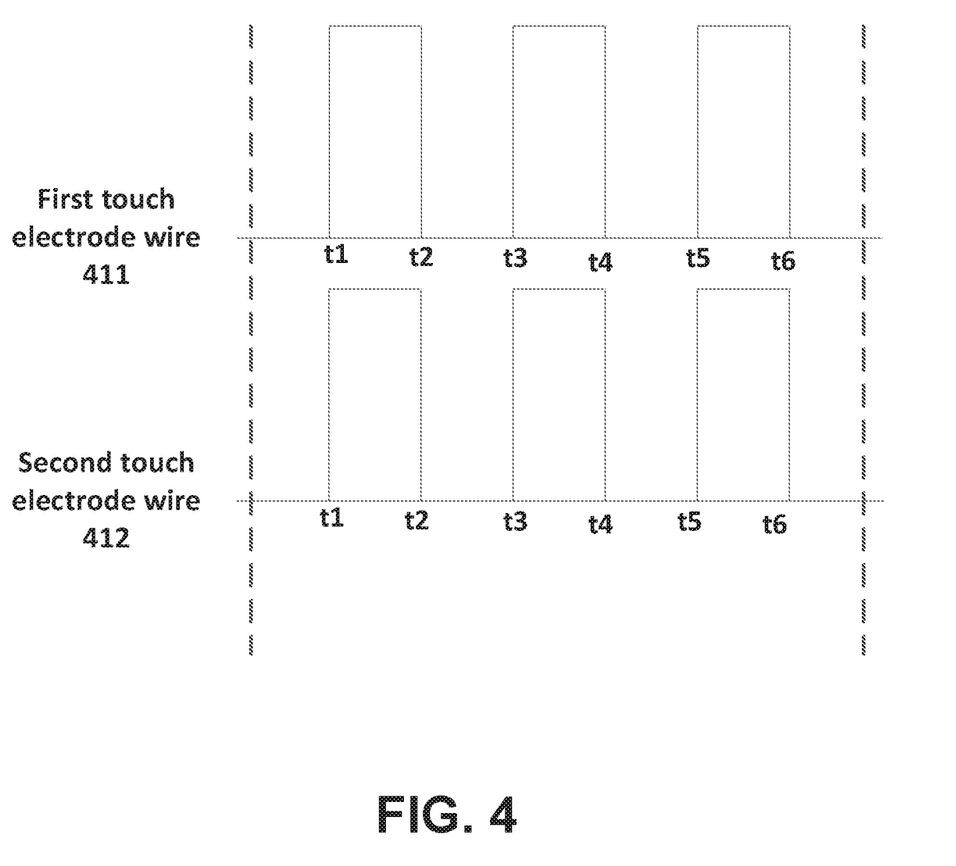
FIG. 4 is a timing diagram of an electrical signal scan of the touch electrode units of the first embodiment of the present invention.

With reference to FIG. 4, FIG. 4 is a timing diagram of an electrical signal scan of the touch electrode units of the first embodiment of the present invention. In time periods of t1-t6, a finger touches the display panel, the first touch electrode wire 411 and the second touch electrode wire 412 of the touch electrode units 41 simultaneously receives the touch signal, and form a self-capacitor with the finger, the capacitance inspection sub-circuit 51 variation of a capacitance of the capacitor of the touch electrode units 41 to determine a touch position, i.e., directions of the X-axis and the Y-axis to further determine a touch position of the touch display device.

Figure 5:
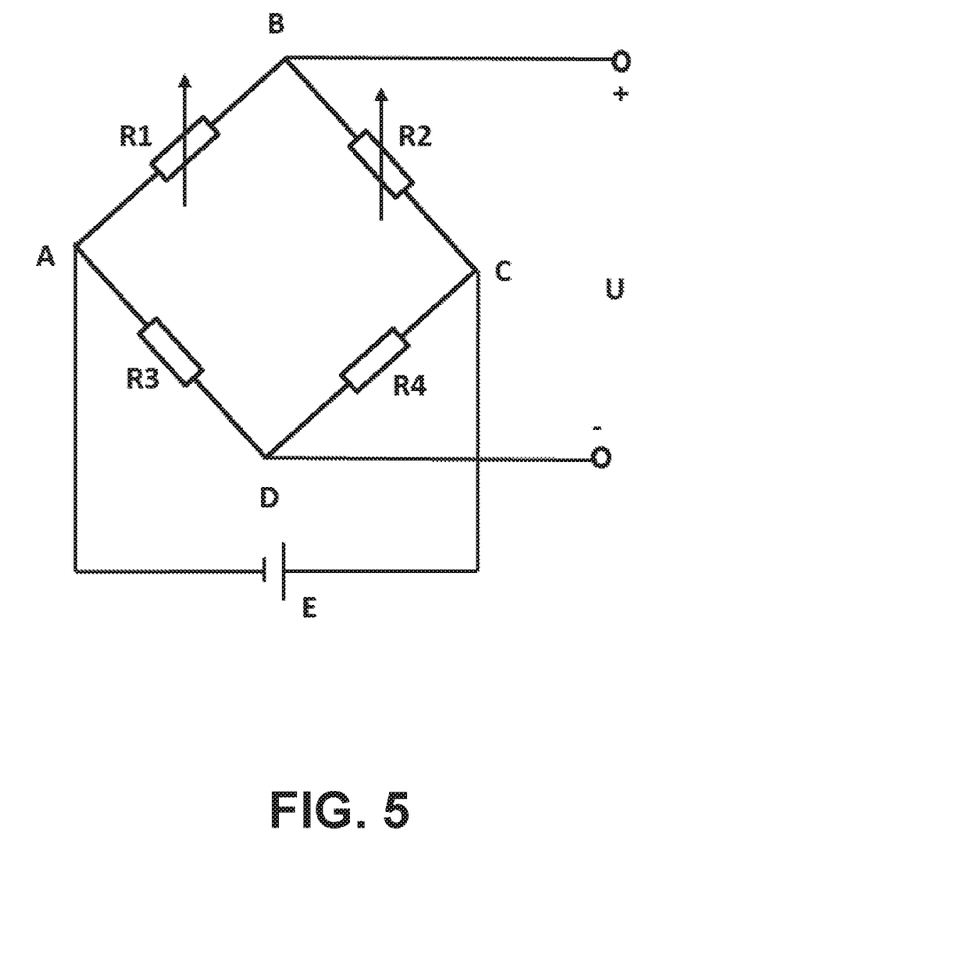
FIG. 5 is a circuit diagram of the pressure inspection sub-circuit of the first embodiment of the present invention.

With reference to FIG. 5, the pressure inspection sub-circuit 52 comprises a compensation resistor R2, a first bridge arm resistor R3, a second bridge arm resistor R4, and a third bridge arm resistor R1. By connection of head and tail ends of a lead wire into a circle, a first bridge arm resistor R1 has a resistance of the first touch electrode single wire 411 connected to second touch electrode wire 412 of the touch electrode units 41 in series.

Specifically, an end of each of the touch electrode units 41 (the first touch electrode single wire 411) is electrically connected to an end of the compensation resistor R2, another end of the compensation resistor R2 is electrically connected to the second bridge arm resistor R4, another end of the second bridge arm resistor R4 is electrically connected to the first bridge arm resistor R3, another end of the first bridge arm resistor R3 is electrically connected to another end (second touch electrode wire 412) of each of the touch electrode units. An end of a power source is electrically connected to another end of the first bridge arm resistor R3 and another end of the touch electrode units, and another end of the power source is electrically connected to another end of the compensation resistor R2 and an end of the second bridge arm resistor R4. Preferably, pressure inspection sub-circuit 52 is a Wheatstone bridge circuit. When a bridge arm ratio is R2/R1=R4/R3, the bridge arms of the pressure inspection sub-circuit 52 are in a balance. When a finger touches and presses against the display panel, the pressed touch electrode units 41 results in variation of the first bridge arm resistor R1. ΔR1 can be calculated according to U such that a pressure of the touch position can be reflect to inspect a direction of the Z axis.

The optical clear adhesive layer 6 is disposed on an upper surface of the touch layer 4 and has a planarization effect to improve a yield rate of the touch layer 4. A material of the optical clear adhesive layer 6 is an organic material, a thickness thereof is 4.5 um-5.5 um, and is preferably 5 um, which can lower a coupling capacitance between the lead wire and a cathode of the touch layer and can also increase an amount of variation of the touch electrode units to improve the touch sensitivity of the touch display device.

The cover plate 7 is disposed on an upper surface of optical clear adhesive layer 6. The cover plate 7 is a protective cover plate, and a material thereof can be hardened plate such as hard plastic, reinforced glass, sapphire. When the user presses against the cover plate 7, the force is transferred to the touch layer 4 under the cover plate 7, the touch layer 4 inspects a touch position and a value of a pressure of the touch position, different pressures defines different operations and such design can extremely improve a user's experience and satisfaction on the product.

The embodiment of the present invention provides a touch display device that uses a touch layer to replace a capacitor touch unit and a pressure touch unit in the prior art to achieve two dimensional and three dimensional inspections for the touch display device. The touch layer is structurally simple, satisfies requirement of light weight and compactness for the touch display device without increasing difficulty of wiring of the touch layer, and lowers the manufacturing cost thereof.

Second Embodiment

Figure 6:
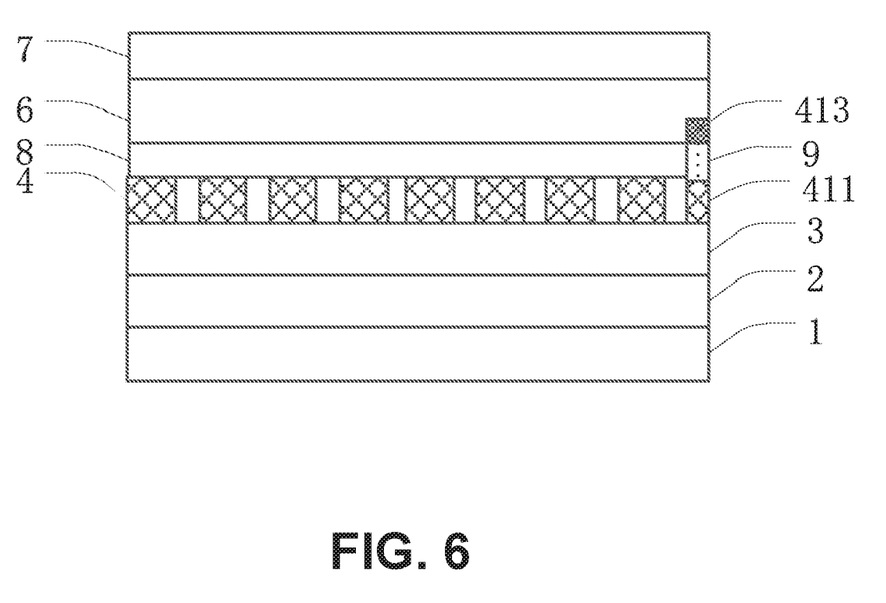
FIG. 6 is a first schematic structural view of the touch display device of a second embodiment of the present invention.
Figure 7:
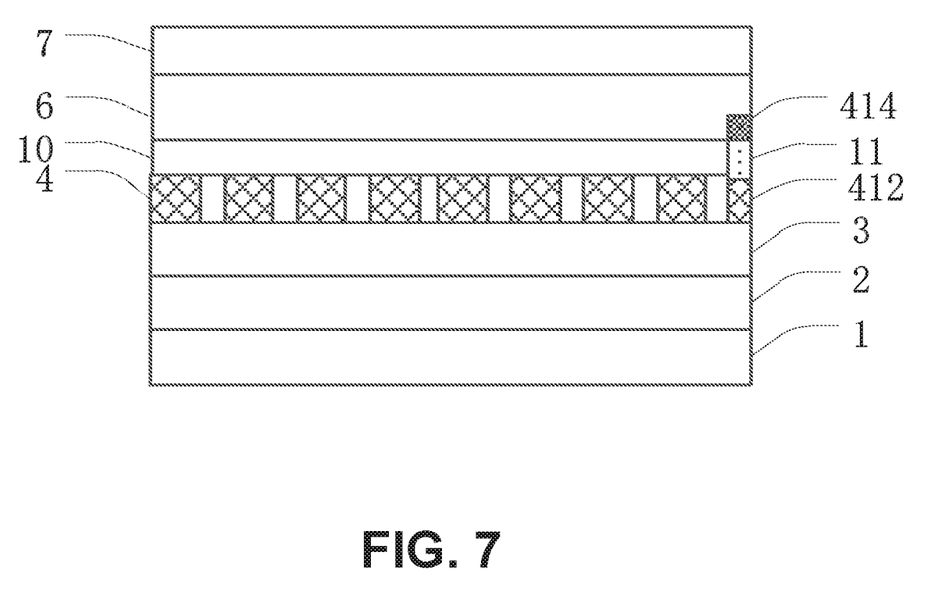
FIG. 7 is a second schematic structural view of the touch display device of the second embodiment of the present invention.
Figure 8:
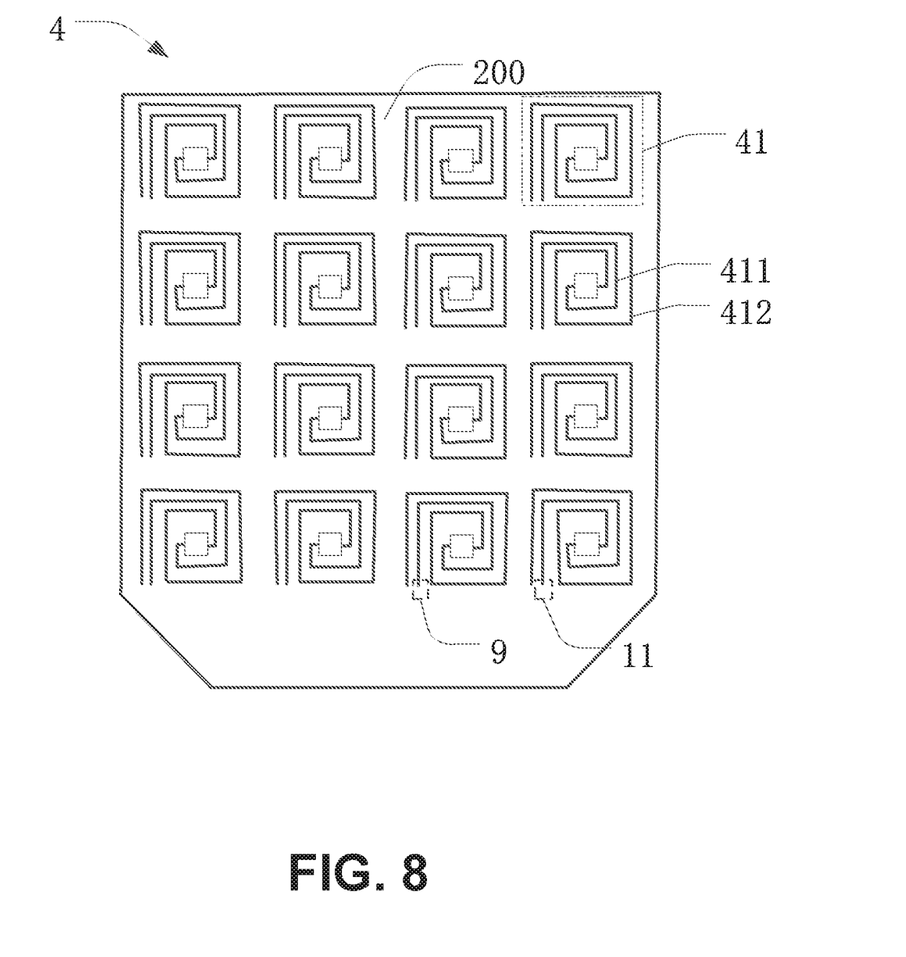
FIG. 8 is a schematic plane view of the touch display device of the second embodiment.

The embodiment of the present invention provides a touch display device comprising most of the technical solutions in the first embodiment 1. A different thereof is that the touch display device further comprises a first insulation layer 9, a first through hole 10, a second insulation layer 11, and a second through hole 12.

With reference to FIG. 6, a first insulation layer 9 is disposed between the first lead wire 413 and the touch electrode units 41. The first lead wire 413 is electrically connected to another end of the first touch electrode wire 411 through the first through hole 10 defined in the first insulation layer such that the first lead wire 413 and the first touch electrode wire 411 are disposed in different layers to reduce a distance between adjacent two of the touch electrode units 41. In other words, a space of the blind region 200 is reduced to further improve the touch sensitivity of the touch display device and optimize the touch capability.

With reference to FIG. 7, a second insulation layer 11 is disposed between the second lead wire 414 and the touch electrode units 41, the second lead wire 414 is electrically connected to another end of the second touch electrode wire 412 through the second through hole 12 defined in the second insulation layer 11 such that the second lead wire 414 and the second touch electrode wire 412 are disposed in different layers to reduce a distance between adjacent two of the touch electrode units 41. In other words, a space of the blind region 200 to further improve the touch sensitivity of the touch display device and optimize the touch capability.

With reference to FIG. 8, in the touch display device, by disposing a first insulation layer 9, a first through hole 10, a second insulation layer 11, and a second through hole 12 the first lead wire 413 and the first touch electrode wire 411 are disposed in different layers and the second lead wire 414 and the second touch electrode wire 412 are disposed in different layers to reduce a distance between adjacent two of the touch electrode units 41. In other words, a space of the blind region 200 to further improve the touch sensitivity of the touch display device and optimize the touch capability.

The embodiment of the present invention provides a touch display device that uses a touch layer to replace a capacitor touch unit and a pressure touch unit in the prior art to achieve two dimensional and three dimensional inspections for the touch display device. The touch layer is structurally simple, satisfies requirement of light weight and compactness for the touch display device without increasing difficulty of wiring of the touch layer, and lowers the manufacturing cost thereof.

The above is only preferred embodiments of the present invention. It should be noted that a person of ordinary skill in the art can make several improvements and modifications without departing from the principle of the present invention. These improvements and modifications should also be considered to be within the scope of protection of the present invention.

What is claimed is:

1. A touch display device, comprising:
a substrate;
a light emitting layer disposed on a side of the substrate;
an encapsulation layer disposed on a side of the light emitting layer away from the substrate;
a touch layer disposed on a side of the encapsulation layer away from the light emitting layer, and comprising a plurality of touch electrode units; and
a touch driver inspection circuit connected to each of the touch electrode units of the touch layer, and configured to according to variation of a capacitance of the touch electrode units and monitor a touch position;
wherein the touch driver inspection circuit is further configured to monitor a pressure of the touch position according to variation of pressures on the touch electrode units;
wherein each of the touch electrode units comprises: a first touch electrode wire and a second touch electrode wire, the first touch electrode wire and the second touch electrode wire are wrapped around a node along a predetermined direction, an end of the first touch electrode wire is electrically connected an end of the second touch electrode wire at the node, and another end of the first touch electrode wire and another end of the second touch electrode wire are electrically connected to the touch driver inspection circuit;
wherein the first touch electrode wire and the second touch electrode wire are wrapped around the node along the predetermined direction to form rectangular coils or circular coils; and
wherein both the first touch electrode wire and the second touch electrode wire are wrapped around the node clockwise or counterclockwise.

2. The touch display device, as claimed in claim 1 wherein the first touch electrode wire and the second touch electrode wire are multi-metal layer structures each of which comprises a pressure-sensitive material layer.

3. The touch display device as claimed in claim 1, wherein each of the touch electrode units further comprises a connection block disposed on the node, the connection block is electrically connected to an end of the first touch electrode wire and an end of the second touch electrode wire.

4. The touch display device as claimed in claim 1, wherein each of the touch electrode units further comprises a first lead wire and a second lead wire;
another end of the first touch electrode wire is electrically connected to the touch driver inspection circuit through the first lead wire; and another end of the second touch electrode wire is electrically connected to the touch driver inspection circuit through the second lead wire.

5. The touch display device as claimed in claim 4, wherein a first insulation layer is disposed between the first lead wire and the touch electrode units, and the first lead wire is electrically connected to another end of the first touch electrode wire through a first through hole defined in the first insulation layer; and a second insulation layer is disposed between the second lead wire and the touch electrode units, and the second lead wire is electrically connected to another end of the second touch electrode wire through a second through hole defined in the second insulation layer.

6. The touch display device as claimed in claim 1, wherein the touch driver inspection circuit comprises a capacitance inspection sub-circuit configured to inspect a capacitance of the touch electrode units and a pressure inspection sub-circuit configured to inspect pressures on the touch electrode units.

7. The touch display device as claimed in claim 6, wherein the pressure inspection sub-circuit comprises a compensation resistor (R2), a first bridge arm resistor (R3), a second bridge arm resistor (R4), and a power source;

an end of the touch electrode units is electrically connected to an end of the compensation resistor (R2), another end of the compensation resistor (R2) is electrically connected to an end of the second bridge arm resistor (R4), another end of the second bridge arm resistor (R4) is connected to an end of the first bridge arm resistor (R3), and another end of the first bridge arm resistor (R3) is electrically connected to another end of the touch electrode units; and an end of the power source is electrically connected to another end of the first bridge arm resistor (R3) and another end of the touch electrode units, and another end of the power source is electrically connected to another end of the compensation resistor (R2) and an end of the second bridge arm resistor (R4).

8. A touch display device, comprising:
a substrate;
a light emitting layer disposed on a side of the substrate;
an encapsulation layer disposed on a side of the light emitting layer away from the substrate;
a touch layer disposed on a side of the encapsulation layer away from the light emitting layer, and comprising a plurality of touch electrode units; and
a touch driver inspection circuit connected to each of the touch electrode units of the touch layer, and configured to according to variation of a capacitance of the touch electrode units and monitor a touch position; and
wherein the touch driver inspection circuit is further configured to monitor a pressure of the touch position according to variation of pressures on the touch electrode units;
wherein each of the touch electrode units comprises: a first touch electrode wire and a second touch electrode wire, the first touch electrode wire and the second touch electrode wire are wrapped around a node along a predetermined direction, an end of the first touch electrode wire is electrically connected an end of the second touch electrode wire at the node, and another end of the first touch electrode wire and another end of the second touch electrode wire are electrically connected to the touch driver inspection circuit;

wherein each of the touch electrode units further comprises a first lead wire and a second lead wire;
wherein another end of the first touch electrode wire is electrically connected to the touch driver inspection circuit through the first lead wire;
wherein another end of the second touch electrode wire is electrically connected to the touch driver inspection circuit through the second lead wire;
wherein a first insulation layer is disposed between the first lead wire and the touch electrode units, and the first lead wire is electrically connected to another end of the first touch electrode wire through a first through hole defined in the first insulation layer; and
wherein a second insulation layer is disposed between the second lead wire and the touch electrode units, and the second lead wire is electrically connected to another end of the second touch electrode wire through a second through hole defined in the second insulation layer.

9. The touch display device, as claimed in claim 8 wherein the first touch electrode wire and the second touch electrode wire are multi-metal layer structures each of which comprises a pressure-sensitive material layer.

10. The touch display device as claimed in claim 8, wherein the first touch electrode wire and the second touch electrode wire are wrapped around the node along the predetermined direction to form rectangular coils or circular coils.

11. The touch display device as claimed in claim 8, wherein each of the touch electrode units further comprises a connection block disposed on the node, the connection block is electrically connected to an end of the first touch electrode wire and an end of the second touch electrode wire.

12. The touch display device as claimed in claim 8, wherein the touch driver inspection circuit comprises a capacitance inspection sub-circuit configured to inspect a capacitance of the touch electrode units and a pressure inspection sub-circuit configured to inspect pressures on the touch electrode units.

13. The touch display device as claimed in claim 12, wherein the pressure inspection sub-circuit comprises a compensation resistor (R2), a first bridge arm resistor (R3), a second bridge arm resistor (R4), and a power source;

an end of the touch electrode units is electrically connected to an end of the compensation resistor (R2), another end of the compensation resistor (R2) is electrically connected to an end of the second bridge arm resistor (R4), another end of the second bridge arm resistor (R4) is connected to an end of the first bridge arm resistor (R3), and another end of the first bridge arm resistor (R3) is electrically connected to another end of the touch electrode units; and an end of the power source is electrically connected to another end of the first bridge arm resistor (R3) and another end of the touch electrode units, and another end of the power source is electrically connected to another end of the compensation resistor (R2) and an end of the second bridge arm resistor (R4).

* * * * *